(12) United States Patent
McRae

(10) Patent No.: US 12,298,019 B2
(45) Date of Patent: May 13, 2025

(54) BATTERY-POWERED WIRELESS ELECTRONIC DEVICE SWITCHABLE BETWEEN HIGH AND LOW POWER OPERATING MODES

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 377 days.

(21) Appl. No.: 17/862,976

(22) Filed: Jul. 12, 2022

(65) Prior Publication Data

US 2023/0012675 A1    Jan. 19, 2023

Related U.S. Application Data

(60) Provisional application No. 63/221,306, filed on Jul. 13, 2021.

(51) Int. Cl.
*F24F 11/46*    (2018.01)
*F24F 11/49*    (2018.01)
*F24F 11/56*    (2018.01)

(52) U.S. Cl.
CPC ............. *F24F 11/46* (2018.01); *F24F 11/49* (2018.01); *F24F 11/56* (2018.01)

(58) Field of Classification Search
CPC ...................................................... F24F 11/46
See application file for complete search history.

(56) References Cited

U.S. PATENT DOCUMENTS

| 10,594,990 B1 | 3/2020 | Lemberger et al. |
| 2011/0237287 A1* | 9/2011 | Klein .................... H04W 84/08 455/521 |
| 2011/0275316 A1 | 11/2011 | Suumaki et al. |

(Continued)

FOREIGN PATENT DOCUMENTS

| EP | 2100454 | 9/2009 |
| EP | 2693811 | 2/2014 |

(Continued)

OTHER PUBLICATIONS

U.S. Appl. No. 17/851,619; filed Jun. 28, 2022.

(Continued)

*Primary Examiner* — Suresh Suryawanshi
(74) *Attorney, Agent, or Firm* — Boyle Frederickson, S.C.

(57) ABSTRACT

A method of and system for conserving power of a battery in a battery-powered electronic device capable of wireless communications are disclosed. The electronic device, which can be a digital video camera or other component of a monitoring system or an HVAC controller, an appliance, or another aspect of a smart home system, is wirelessly communicable with one or more hubs over a wireless local area network. The electronic device has at least a high power radio and a low power radio operating at different frequencies. Communications switch from the high power radio to the low power radio upon the occurrence of a trigger event such as battery charge dropping below a designated threshold. The electronic device may be part of a WLAN coupled to a WAN via the Internet and a cellular network.

18 Claims, 3 Drawing Sheets

(56) References Cited

U.S. PATENT DOCUMENTS

| | | | |
|---|---|---|---|
| 2013/0035093 A1* | 2/2013 | Doyle | H04W 88/06 |
| | | | 455/426.1 |
| 2014/0266705 A1 | 9/2014 | McKinley et al. | |
| 2014/0337923 A1 | 11/2014 | Anders et al. | |
| 2014/0354768 A1 | 12/2014 | Mei et al. | |
| 2016/0212575 A1* | 7/2016 | Nandagopalan | H04W 4/80 |
| 2016/0234675 A1* | 8/2016 | Ghoshal | H04W 8/205 |
| 2016/0338136 A1 | 11/2016 | Zhang et al. | |
| 2016/0365885 A1* | 12/2016 | Honjo | H04B 1/38 |
| 2017/0099157 A1 | 4/2017 | Jacobson et al. | |
| 2018/0286200 A1 | 10/2018 | Gordon et al. | |
| 2019/0059052 A1* | 2/2019 | Nord | H04W 28/0221 |
| 2019/0261243 A1 | 8/2019 | Amini et al. | |
| 2020/0344695 A1 | 10/2020 | Wang et al. | |
| 2021/0219235 A1* | 7/2021 | Hardt | H04L 12/12 |

FOREIGN PATENT DOCUMENTS

| | | |
|---|---|---|
| EP | 2740301 | 6/2014 |
| WO | 2021046402 | 3/2021 |

OTHER PUBLICATIONS

U.S. Appl. No. 17/825,196; filed May 26, 2022.
U.S. Appl. No. 17/851,600; filed Jun. 28, 2022.
U.S. Appl. No. 17/947,534; filed Sep. 19, 2022.

* cited by examiner

BATTERY-POWERED WIRELESS ELECTRONIC DEVICE SWITCHABLE BETWEEN HIGH AND LOW POWER OPERATING MODES

CROSS-REFERENCE TO A RELATED APPLICATION

This application claims the benefit of provisional patent application U.S. application Ser. No. 63/221,306, filed on Jul. 13, 2021 and entitled "Battery-Powered Wireless Electronic Device Switchable Between High and Low Power Operating Modes", the entire contents of which are hereby expressly incorporated by reference into the present application.

BACKGROUND OF THE INVENTION

1. Field of the Invention

The present invention relates to a system and method of conserving power of a battery in a battery-powered electronic device that is capable of communicating with other system components wirelessly. More particularly, the invention relates to a battery-powered electronic device that automatically switches between two radios, such as a high bandwidth/high power radio and a low bandwidth/low power radio, for conserving the life of the device's battery. The invention additionally relates to a method of operating such a device and a monitoring system incorporating such a device.

2. Discussion of the Related Art

Electronic systems with wireless components are increasing in popularity and technical sophistication. Such systems include smart home systems, electronic monitoring systems, and components of them. The wireless devices include HVAC controllers, appliances, lights, monitoring devices including cameras, and sensors. Recent systems implemented through WLANs (wireless local area networks) have simplified hardware mounting and installation by eliminating various hardwired signal-conducting wires for wireless device communications. Such systems typically include one, and more typically several, wireless devices that communicate wirelessly with a base station hub in communication with a wide area network (WAN), typically via the Internet. The system also communicates wirelessly with one or more user devices, such as a smart phone, and possibly with an external server such as a cloud-based server.

For example, Wi-Fi™ enabled video cameras are in wide use and are often used for monitoring and security purposes. Content captured by wireless enabled cameras can be communicated over the Internet. The content can be viewed in substantially real time and/or recorded for later viewing.

Some video cameras are Wi-Fi™ enabled and battery powered. An example of such a camera is disclosed in U.S. Pat. No. 9,713,084, assigned to Arlo Technologies, Inc., the content of which is incorporated herein by reference. The wireless camera can be connected to a Wi-Fi™ enabled base station (BS) or access point (AP). While the wireless camera can transmit video and audio content via a Wi-Fi™ connection, such transfer can require high power utilization. Therefore, the batteries of such devices must be frequently recharged or replaced.

Some wireless cameras offer low power or "sleep" modes in which certain components of the camera are powered off under some operating conditions to conserve power. For example, the imaging device, radio or transmitter, and related components of a wireless camera may be powered down when operating in low power mode, leaving only the motion sensor or other presence detector fully operational. The "sleeping components" take time to power up, leading to a lag between triggering of the presence sensor and image capture and transmission. Thus, while low power mode operation does increase the battery life of a given device, it also reduces functionality of the device, which is oftentimes undesirable.

Additionally, the transmission of images, short videos, and the graphics interchange format (GIF) animations using a low power radio is commonly known. While the use of low power radios is sufficient for the transmission of limited content, high quality videos or simultaneous multimedia streaming of images and sounds is oftentimes unavailable with these types of radios.

Accordingly, a need exists to allow for an electronic device, such as a video camera, to switch between high and low power modes to be capable of transmitting high-bandwidth media and low bandwidth media.

What is further needed is a video camera or other electronic monitoring device that switches operation between separate local area networks that operate at different frequencies, and thus have different battery use requirements.

SUMMARY OF THE INVENTION

In one aspect, a method of conserving power of a battery in a battery-powered electronic device is disclosed. The device may be, for example, a smart-home component such as an HVAC controller, an appliance, or a smart lighting system. The device also could be a monitoring device of a monitoring system, such as a digital video camera. The electronic device includes a high power radio and a low power radio. The method includes the electronic device capturing media, after which the media can be transmitted either using the high power radio in a high power mode or the low power radio in a low power mode. In the low power mode, the high power radio can either be turned off completely or put into a sleep mode. "Media" or "media-based data" as used herein means captured data or data derived from captured data. Battery power is conserved while functionality is retained in either case. The electronic device can be switched from the high power mode to the low power mode, and from the low power mode to the high power mode, based on a number of trigger events; including dropping of battery power below a designated threshold, reaching a time-based on a predetermined schedule of events, user input, etc.

The high power radio may be a wireless local access network radio operating at frequency of above one GHz, such as 2.4 or 5 GHz, and the low power radio may be a sub-GHz radio. The high power radio may be connected over an extended range through the Internet as part of a wide area network (WAN). The low power radio can connect with a WAN on its own due to the longer distances achievable by a lower frequency radio.

Also disclosed is a method of operating an electronic device having at least some of the characteristics described above.

Another aspect of the present invention provides an electronic device, such as a digital video camera, that includes a imaging device or data capture element, a battery, a high power radio having a first power requirement, a low power radio having a second power requirement that is lower than the first power requirement, and a controller. The controller is configured to cause the high power radio to transmit data in the absence of the occurrence of a trigger event and to cause the low power radio to transmit data upon occurrence of the trigger event.

The high power radio may operate at a frequency of over 1 GHz, and the lower power radio is sub-GHz radio operating at a frequency of less than 1 GHz.

In accordance with yet another aspect of the invention, a monitoring system is provided that includes a base station hub, a security hub, and at least one digital video camera. The base station hub is operatively connected to a wireless wide area network (WAN) and has a high power radio having a first power requirement. The security hub has a low power radio having a second power requirement that is lower than the first power requirement. The camera includes an image capture element, a battery, a high power radio having a first power requirement that is in operative communication with the high power radio of the base station hub, and a low power radio having a second power requirement that is in operative communication with the low power radio of the security hub. A controller, which may be located in the camera, is configured to cause the high power radio of the camera to transmit media based data to the base station hub in the absence of the occurrence of a trigger event and to cause the low power radio of the camera to transmit media-based data to the security hub upon occurrence of the trigger event.

The high power radios may be wireless local area network (WLAN) radios operating at a frequency of from 2.4 MHz to 5.12 MHz, and the low power radios may be sub GHz radios operating a frequency of less than 1 MHz.

The base station hub may be connected to the Internet, and the security hub may be connected to a cellular network.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
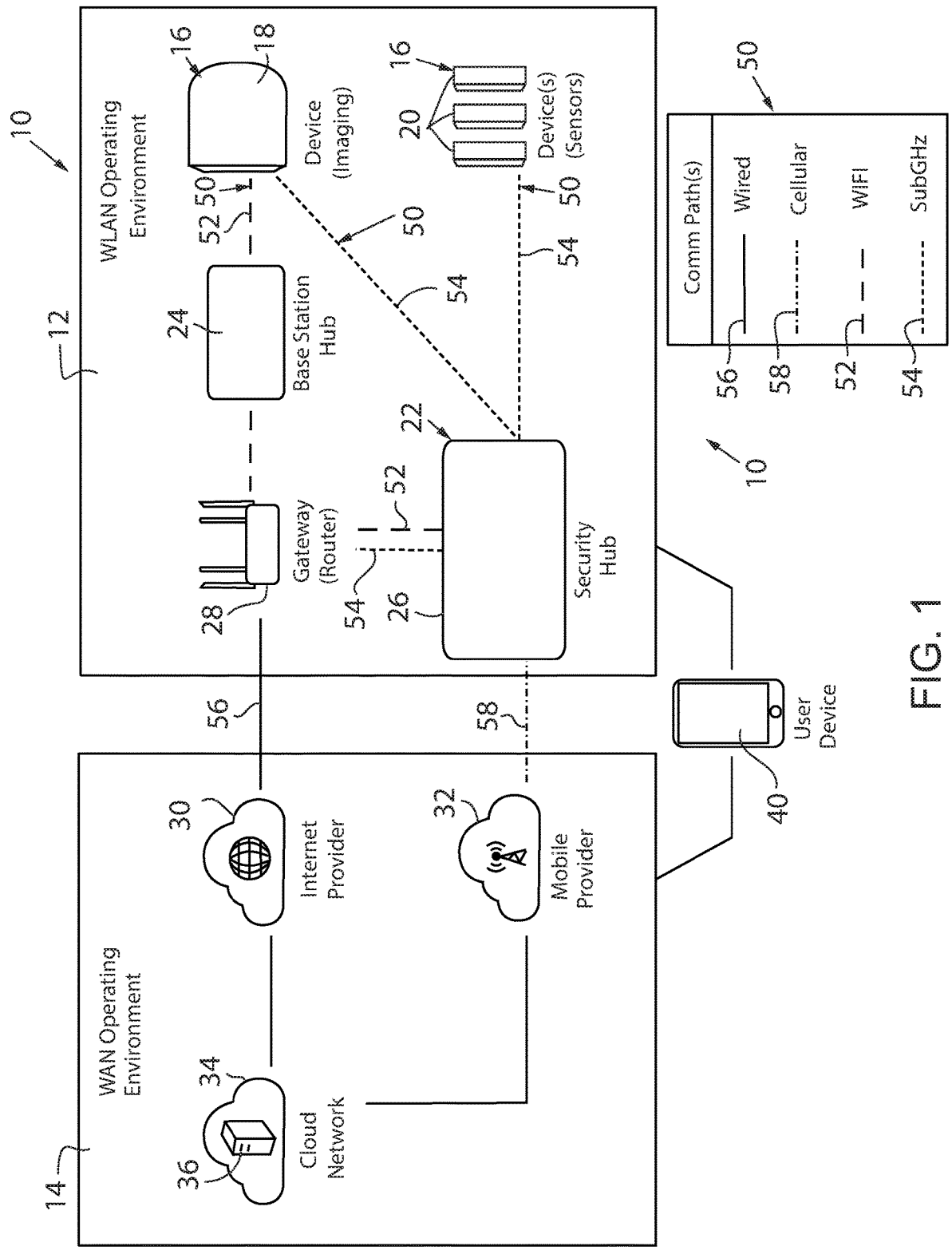
FIG. 1 is schematic representation of a system for capturing, transmitting, and displaying images according to aspects of the invention.

Referring now to FIG. 1, in accordance with an aspect of the invention, a system 10 is provided that is implemented in a WLAN (wireless local area network) operating environment 12. The WLAN 12 is communicatively connected to a WAN (wide area network) operating environment 14. Various electronic devices 16, sometimes referred to as "client devices," Operate within WLAN 12. One or more of these devices 16 is wirelessly networked to a base station or high frequency hub 24 which, in turn, communicates wirelessly with the WAN 14 via a gateway hub or router 28 and the Internet. One or more of the electronic devices also are connected to a security hub 26, which is connected to the WAN 14 via a cellular network and/or via the internet and the router 28. Most systems will employ several devices 16 of the same or varying configurations as described below, many or all of which are connected to both the base station hub 24 and the security hub 26. Base station hub 24 may be eliminated as a stand-alone module if its functionality is incorporated into the gateway router 28, in which case the router 28 also serves as a base station hub. Security hub 26 may be eliminated as a stand-alone module if its functionality is incorporated into the gateway router 28 and/or the base station hub 24, in which case the router 28 and/or the base station hub 24 also serves as a security hub.

The illustrated system 10 is a monitoring system with electronic devices 16 in the form of monitoring devices, it being understood that the invention also is applicable to other systems, such as smart home systems with devices such as HVAC controllers, appliances, and lighting systems.

Still referring to FIG. 1, each monitoring device 16 of the illustrated embodiment may perform any of a variety of monitoring, sensing, and communicating functions. One such device may include an imaging device 18, such as a video camera, that is configured to capture and store visual images or video of the monitored area within the environment. One such camera is an Arlo® camera available from Arlo Technologies, Inc. of Carlsbad, California Typically, system 10 will include multiple monitoring devices 16 that are mounted to face toward respective areas being monitored, such as around a building or other structure or area. Instead of or in addition to containing a video camera or other imaging device 18, one or more of the monitoring devices 16 may include one or more sensors 20 configured to detect one or more types of conditions or stimuli; for example, motion, opening or closing events of doors or windows, the presence of smoke, carbon monoxide, water leaks, and temperature changes. The imaging devices 18 and/or other monitoring devices 16 may further include or be other devices such as audio devices; including microphones, sound sensors, and speakers configured for audio communication or providing audible alerts, such as Arlo Chime audible devices. The cameras or imaging devices 18, sensors 20, or other monitoring devices 16 also may be incorporated into form factors of other house or building accessories, such as doorbells, floodlights, etc. At least one of the monitoring devices 16 has two radios having different power requirements. The second radio is employed when the power to the primary radio is low or in response to some other trigger event.

Still referring to FIG. 1, gateway router 28 is typically implemented as a WIFI hub that communicatively connects WLAN 12 to WAN 14 through an internet provider 30. Internet provider 30 includes hardware or system components or features such last-mile connection(s), cloud interconnections, DSL (digital subscriber line), cable, and/or fiber-optics. As mentioned, the functionality of the base station hub 24 also could be incorporated into the router 28, in which case the router 28 becomes the base station hub as well as the router. Another connection 58 between WLAN 12 and WAN 14 may be provided between security hub 26 and a mobile provider or cellular network 32. Mobile provider 32 includes hardware or system components or features to implement various cellular communications protocols such as 3G, 4G, LTE (long term evolution), 5G, or other cellular standard(s). Besides the mobile connection, security hub 26 is typically also configured to connect to WAN 14 by way of its connection to router hub 28 and the router hub's connection to WAN 14 through internet provider 30. Each of the internet provider 30 and mobile provider 32 allows the components of system 10 to interact with a backend system or control services that can control functions or provide various processing tasks of components of system 10, shown as a cloud-based backend control service system 34, which could be an Arlo SmartCloud system. The backend system, such as the cloud-based control service system 34, includes at least one server 36 and typically provides, for example, cloud storage of events, AI (artificial intelligence) based processing such as computer vision, and system access to emergency services.

Still referring to FIG. 1, one or more user devices 40, such as a smart phone, tablet, laptop, or PC may communicate with various components or devices within each of WLAN 12 and WAN 14 to provide an interface through which a user may interact with system 10. Each user device 40 includes a display system that typically includes both an audio interface such as a speaker and a microphone and a video display such as a touchscreen. Each user device 40 also has internal computing and storage capabilities and a program or application, such as the Arlo Smart™ application, serving as the user interface with the remainder of system 10.

Still referring to FIG. 1, within WLAN 12, multiple communication paths 50 are defined that transmit data between the various components of system 10. Communication paths 50 include a first or high power communication path 52 providing high frequency communications between the associated monitoring device 16 and the base station hub 26, and a second or low power communication path 54 providing low frequency communication between the associated monitoring device 16 and the security hub 26. Optionally, one or more monitoring devices 16 that are not benefitted by high bandwidth operation, such as the sensors 20 shown in FIG. 1, may be able to communicate exclusively through the second communication path 54 with full functionality. Other monitoring devices 16 that are benefitted by high bandwidth communication may maintain at least some of their functions and operations while communicating over the second communication path 54, but may perform these at lower-bandwidths and, therefore, transmit less data. An example is an imaging device 18 that may continue its optical monitoring activities of an environment, but in a low power mode that implements still image(s) and/or video capture with lower-resolution (for both still images and video capture) and/or shorter clip duration or a GIF animation while communicating through the second communication path 54.

Still referring to FIG. 1, a communication path 56 is shown between the router 28 and the Internet provider 30, and a cellular communication path 58 is shown between security hub 26 and the mobile provider or cellular network 32. Security hub 26 also may be wirelessly connected to router 28 via one or both the first, high power communication path 52 and the second, low power communication path 54. WAN 14 typically includes various wireless connections between or within the various systems or components. The controller of one or more of the monitoring devices 16 also could provide a wireless communication path 52 directly to the base station hub 24 or the router 28, if the router 28 serves as a base station hub.

Figure 2:
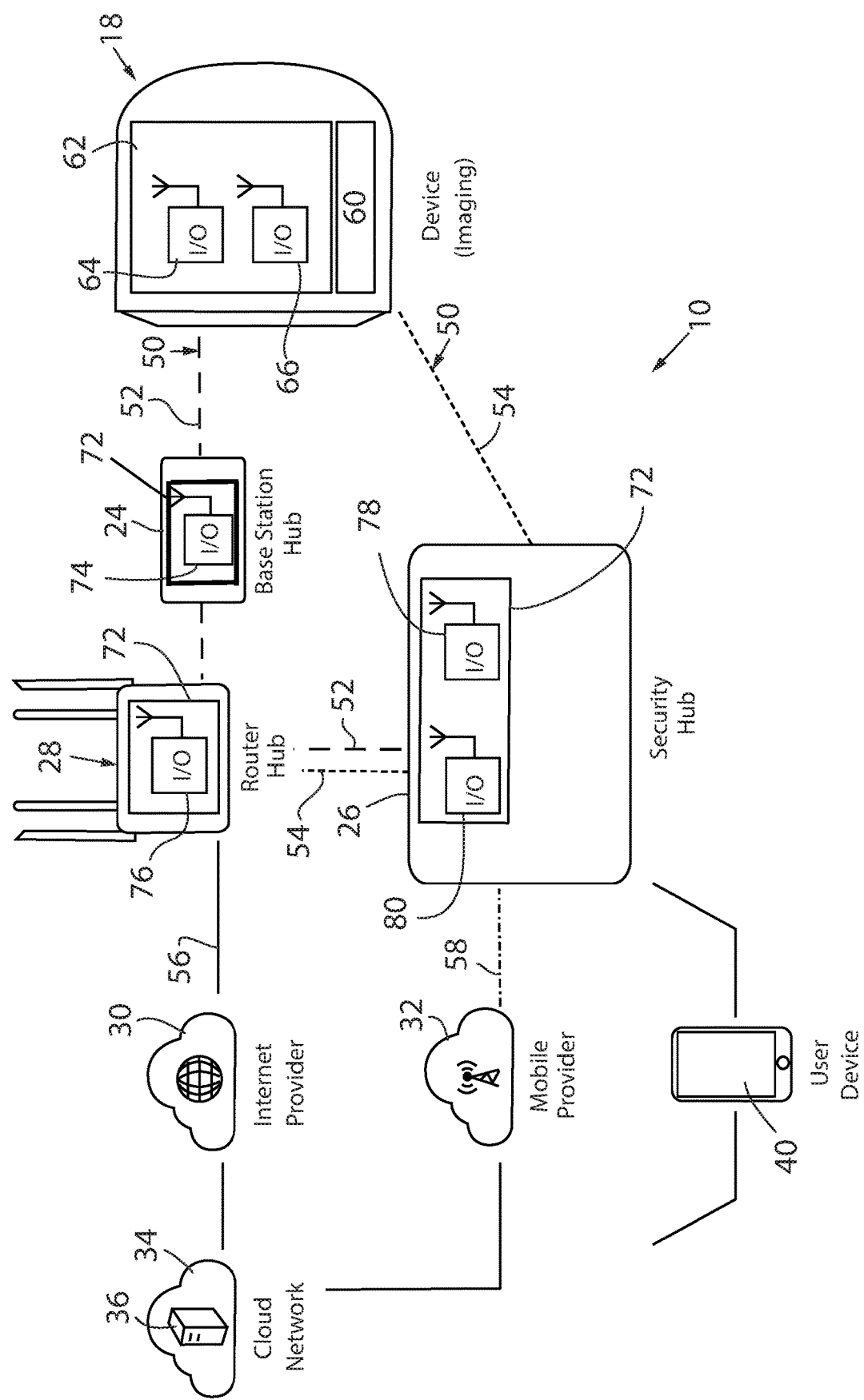
FIG. 2 is a block diagram corresponding to FIG. 1 and showing communication paths within the system in greater detail.

Referring now to FIG. 2, system 10 is configured to implement a seamless communication environment by implementing a communication path switching strategy involving switching or toggling between communication over the first and second communication paths 52, 54. The monitoring device shown in this figure is an imaging device 18 configured to capture visual images and, more specifically, a digital video camera configured to capture video images; it being understood that other monitoring devices also could have two radios communicating over two communication paths as well. The seamless communication environment may be achieved by providing the imaging device 18 and hubs 24 and 26 with circuitry, software, and cooperating components that permit switching between communication paths 52 and 54. Each imaging device 18 is configured to acquire data and to transmit data to a hub 24 and/or 26 for further processing and/or further transmission to a server such as the server 36 of the cloud-based control service system 34. Data is transmitted between the server 36 and the user device 40 and possibly between the base station hub 24 and/or security hub 26 and the user device 40 as well. The server 36 or other computing components of system 10 or otherwise the WLAN 12 or WAN 14 can include or be coupled to a microprocessor, a microcontroller or other programmable logic element (individually and collectively considered "a controller") configured to execute a program. The controller(s) also may be contained in whole in the monitoring device 16, base station hub 24, security hub 26, and/or the WIFI hub or router 28. Alternatively, interconnected aspects of the controller and the programs executed by it could be distributed in various permutations within the monitoring device 16, the hubs 24 and 26, router 28, and the server 36. This program may be utilized in filtering, processing, categorizing, storing, recalling and transmitting data received from the monitoring device 16 via the hubs 24 and 26, the router 28, and the server 36. Server 36 or another appropriate system device may also be in communication with or include a computer vision program ("CV"), which can apply one or more filters or processes, such as edge detection, facial recognition, motion detection, etc., to one or more detected characteristics of the recording such as, but not limited to, identifying an individual, animal, vehicle, or package present in the recording.

Still referring to FIG. 2, each imaging device 18 is powered by a battery 60 and has circuitry 62 that includes corresponding hardware, firmware, software, or any combination thereof. Circuitry 62 of imaging device 18 may include, for example, imagers, an audio circuit, a media encoder, a processor, and a non-transient memory storage device, among other components. The circuitry 62 includes at least two wireless I/O communication devices or radios, including a first or high power radio 64 and a second or low power radio 66. These radios are described in further details below in conjunction with the discussion of their respective communication paths 52 and 54.

Still referring to FIG. 2, each hub 24 and 26 has circuitry 72 that includes corresponding hardware, firmware, software, or any combination thereof for controlling, for example, data transmission or other communications through respective segments of system 10. Circuitry 72 includes a processor and a non-transient memory storage device, among other components. Circuitry 72 of the different hubs 24 and 26 of system 10 may have different numbers and types of wireless I/O communication devices or radios, while allowing for the establishment of discrete communication paths 50 with each radio including, for example, a transceiver and cooperating antenna for transmitting and receiving signals or data. For example, the circuitry 72 of base station hub 24 includes a high power radio 74 that communicates with the high power radio 64 of imagining device 18. Radio 74 also communicates with a high power radio 76 in the router 28, which transmits data within the WLAN 12 (FIG. 1). The security hub's 26 radios include a low power radio 78 which communicates with the low power radio 66 of the imaging device 18 via communication path 54, and a high power radio 80 which communicates with the high power radio 76 of the router 28. Instead of or in addition to being a high power radio, the radio 80 may be or include a cellular radio that transmits data between the server 36 and the security hub 26 via a cellular network through the cellular communication path 58.

In one construction, since the base station hub 24 is powered by an enduring power source (e.g., power outlet), it is not necessary for the base station hub 24 to be operated in a default sleep mode, although this is not precluded. An exemplary base station hub capable of incorporating aspects of the invention is an Arlo SmartHub™ base station available from Arlo Technologies in Carlsbad, California, US. In addition, it is conceivable that the base station hub 24 could have a battery backup. It also could communicate with the security hub 26 and/or the server 36 without relying on the router 28, thus providing at least limited functionality in the event of power loss to the router 28 and/or failure of the Internet. For example, base station hub 24 could include a cellular radio capable of communication with the server 36 via the cellular network.

Still referring to FIG. 2, high power radios 64, 74, and 80 transmit data at a different power, frequency and bandwidth than the slow power radios 66, 78. Therefore, the first and second communication paths 52, 54 correspondingly define different operational power requirements, frequencies, and bandwidths. Typically, the communication path 52 has a higher frequency, a higher bandwidth, and consumes more power than the communication path 54. Further, the communication path 52 provides medium range connectivity and operates using a WIFI communication protocol, such as those prescribed by the IEEE 802.11 standards. Although the communication path 52 is illustrated as a single path, it is understood that the primary communication path 52 may provide multi-component WIFI communications by, for example, dual-band implementation(s) and corresponding radio(s) that can communicate at both 2.4 GHz and 5 GHz WIFI frequencies. Suitable frequencies of the sub-GHz secondary communication path 54 include RF ranges of 800-900 Mhz, 80-90 Mhz, and cellular (3G, 4G, LTE, 5G) bands, and which may be a proprietary communications protocol, such as the Armor sub-GHz protocol. Both radios 64 and 66 of imaging device 18 could operate from the same processor. Alternatively, the imaging device 18 may have more than one processor. The "controller" within the imaging device 18 contains the processor(s) as well as memory modules and other circuitry as described above.

By including the first, high power radio 64 and the second, low power radio 66, the imaging device 18 can be toggled between at least two power modes; the first in which transmissions between the imaging device 18 and the base station 24 solely or primarily occur using the first radio 64, and the second in which transmissions between the imaging device 18 and the security hub 26 solely or primarily occur using the second radio 66. Relatively speaking, the first would be a "high power mode" and the second would be a "low power mode". Additionally, in the high power mode, the second radio 66 could also be operating so that the imaging device 18 can quickly be switched to the low power mode. For additional power savings, low power radio 66 could be depowered or put in a deep sleep state when communications occur via the high power radio 64. In the low power mode, the first radio 64 could be completely powered off, or it could be put into a deep sleep mode to minimize power consumption.

In operation of a system including imaging devices; each imaging device 18 can be configured, though suitable mounting of the imaging device 12 and/or through suitable manipulation of its controls, to monitor an area of interest, such as a part of a building or section of property. An imaging device 18 may capture an image upon receipt of a command from a user device 40. An image also may be captured automatically upon detection of a triggering event detected by a detector. The triggering event may be motion, and the detector may be a motion detector. Instead of or in addition to detecting motion, the detector could include an IR sensor detecting heat, such as the body heat of an animal or person. The triggering event also could be sound, in which case the detector may include a microphone. If this is the case, then the triggering event may be a sound exceeding a designated minimum decibel level or some other identifiable threshold. Upon receiving a notification from an imaging device 18 of the occurrence of a triggering event, the system can generate an alert such as a push notification ("PN") and send it to one or more user devices 40 to indicate occurrence of the triggering event.

Whether camera operation is triggered by a command from a user device 40 or by detection of a triggering event, the camera of imaging device 18 can then capture a raw video stream which, in turn, can be provided to the media encoder for producing video packets in an encoded video stream. Similarly, the microphone and the associated audio circuit can capture a raw audio stream which, in turn, can be provided to the media encoder for producing audio packets in an encoded audio stream. Accordingly, the video and/or audio packets, referred to herein as "media" packets, are provided in an encoded media stream. Under control of the processor executing the program, the encoded media stream can be transmitted either from the first, high power radio 64 of the imaging device 18 to the radio 74 of base station hub 24 or from the second, lower power radio 66 of the imaging device 18 to the radio 78 of the security hub 26. Data transmission after this communication will be discussed in more detail below in conjunction with FIG. 3.

Each imaging device 18 may switch between high and low power modes in response to any of a number of non-mutually exclusive mode switching trigger events. These trigger events are to be distinguished from motion detection or other triggering events the occurrence of which trigger image capture. One trigger event could be the battery charge of the imaging device 18 dropping beneath a designated threshold. That threshold may be preset and invariable or user settable using an app in the user device 40. By way of example, a user could select a minimum charge threshold, such as 10%, at which point the imaging device 18 would be moved from the high power mode to the low power mode. A notification such as "CHARGE BATTERY: LOW POWER MODE INITIATED" may be sent to the user device 40 upon this switchover. The imaging device then could automatically switch back to high power mode when battery charge exceeds the same or a different threshold, which most typically will be considerably higher than the first threshold but lower than 100%. A threshold of 60% is one example. A notification such as "BATTERY CHARGED: HIGH POWER MODE RESUMED" could be transmitted to the user device 40 at this time.

As another example of a trigger event, the imaging device 18 can manually be switched to the low power mode using an app on the user device 40, a user interface on the base station 24, or any other device in communication with the imaging device. The user could consciously select a power mode, or the user could cause the system 10 to switch between power modes depending on the type of media the user wants the imaging device 18 to transmit. For example, a desire to receive high resolution videos and/or long videos could trigger operation in high power mode. Conversely, an expressed desire to receive still images or GIF animations could trigger operation in low power mode.

Further still, the trigger event could be automatically toggling between the low power mode and high power mode based on a specified schedule. This option may be desirable if the user believes that low resolution or still images are acceptable over certain periods of time, such as during certain times of day, but not others. For example, the user may prefer low power mode operation during periods of perceived low security risk, such as during the daytime, and high power modes during periods of perceived high security risk, such as during the nighttime. Using an app on user device 40, a user interface on base station hub 24, or even on the imaging device 18, the user may set a schedule for switching between modes. This schedule may be independent of any other trigger events but, more typically, would work in conjunction with them such that it is overridden by a user selection or a low-power situation when the imaging device 18 is operating in high-power mode. Other rules-based methods can similarly be employed to automatically toggle the imaging device 18 between the low power and high power modes.

While most of the examples above contemplate an imaging device 18 that defaults to the high power mode, the imaging device 12 may also be configured to default to the low power mode unless specific trigger events occur that move the imaging device 18 from the low power mode to the high power mode. This operating mode could be implemented, for example, to maximize the battery life.

The app within the user device 40 may enable a user to control both the imaging device 18 and features relating to the low power mode, the high power mode, the first radio 64, and the second radio 66. In addition to allowing the user to switch the imaging device between the high power mode and the low power mode; the user can alter various settings, including specific time intervals in either power mode as will further be described below. The user interface of user device 40 can also provide the user with relevant information, including which power mode each imaging device 18 is in, an indication of the percentage of battery charge remaining, an indication of the estimated remaining battery life in both the high and low power modes given the current battery level as well as other historic or predictive data, etc. Such information can also be color coded or otherwise keyed to improve ease of review. Further still, the app could generate a display indicating a desired day and time for battery recharging or replacement.

For the imaging devices 18 described above, it should be appreciated that conserving the power of the battery 60 and avoiding undue power drainage of the battery 60 is desirable. By conserving power and avoiding undue power drainage, the battery 60 requires less frequent recharging and/or replacement, which is both more convenient and less expensive for the user.

Figure 3:
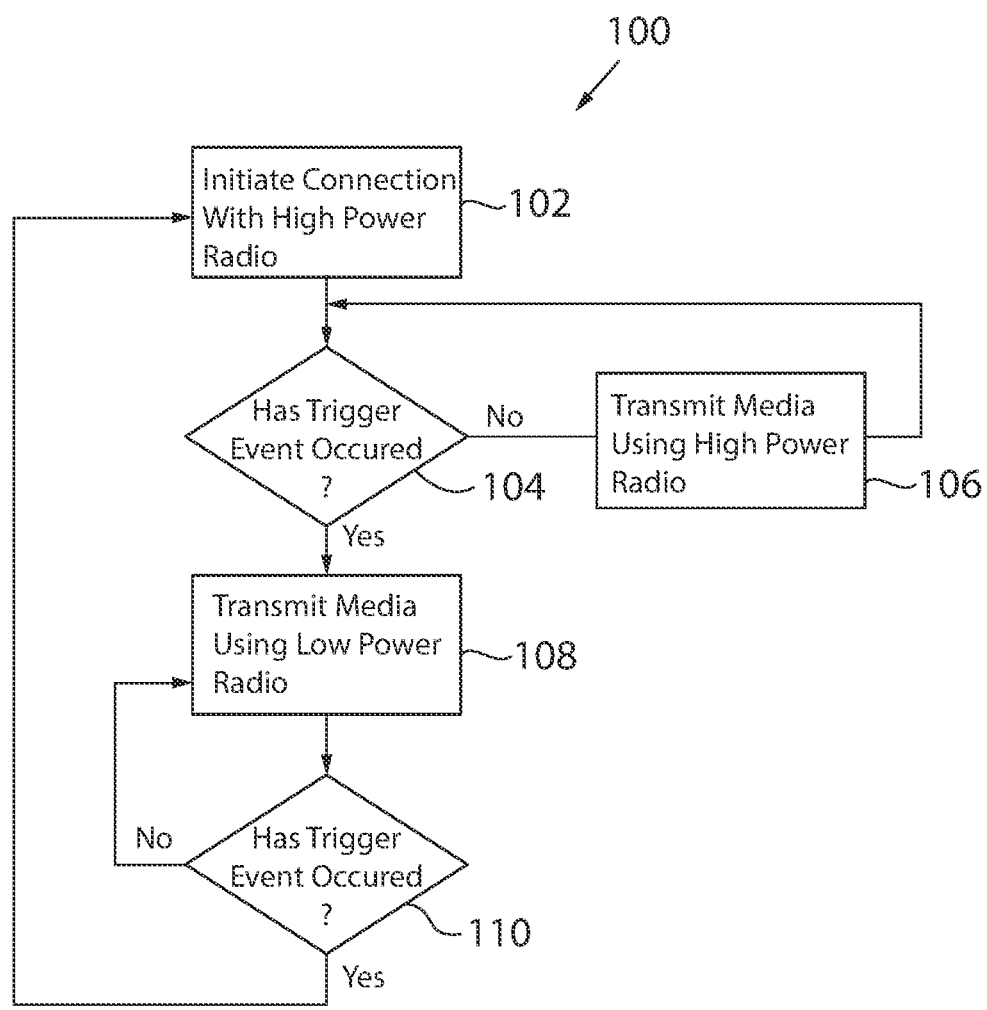
FIG. 3 is flowchart of a method of operating the camera represented in FIG. 2.

A process 100 for operating an imaging device 18 in high and lower power modes and for switching between them is shown in FIG. 3. That process begins on the assumption, that the imaging device is preset, by the factory or the user, to operate in high power mode as a default. As mentioned above, that need not necessarily be the case. The process 100 proceeds to block 102 to power-up or enable the high power radio 64 and to pair that radio with the radio 74 of base station hub 24. The process 100 proceeds to block 104 to determine whether a trigger event has occurred. As mentioned above, the trigger event may be the battery charge dropping below a threshold, a user command, the occurrence of a scheduled event, or another event that can be defined using rules-based logic. If the answer to this inquiry is NO, the process proceeds to block 106, and the imaging device 18 operates in high power mode. Media such as high resolution video and/or relatively long duration video is transmitted from the high power radio 64 of imaging device 18 to the radio 74 of base station 24. The base station 24 may further process the received data and then transmit data to the server 36 via the router 28 and the Internet for further processing and, ultimately, storage and transmission to user device 40 or other devices.

If the answer to inquiry block 104 is YES, the process proceeds to block 108, where the high power radio 64 is depowered or put in a deep sleep state. The low power radio 66 is awoken or powered up and paired with the low power radio 78 of security hub 26, if necessary, and media such as still images or low resolution and/or short duration GIF animations is transmitted between radios 66 and 78 over communication path 54. The security hub 26 may further process the received media-based data and then transmit data to the server 36 via the cellular network and/or the Internet via the router 28 via radio 80. The server 36 then will further process and/or store the received data and execute other tasks such as transmitting media and/or other communications to the user device 40 or other devices. The server 36 may also transmit other information to device(s) 40, such as a push notification that the imaging device 18 is operating in low power mode.

Still referring FIGS. 2 and 4, the process 100 then proceeds to block 110 to determine whether a trigger event commanding switching back to high power mode operation has occurred. That trigger event may be the detection of a battery charge above a certain upper threshold of, for example, 60%, the receipt of a user command to operate in high power mode, and/or the occurrence of a scheduled event, or the satisfaction of some other rules-based inquiry. If not, the process 100 returns to the block 108, and operation in low power mode continues. If so, the process 100 returns to block 102. At this time, the low power radio 66 may be depowered down or put in a deep sleep mode. Alternatively, the low power radio 66 could remain operational so that the imaging device 18 can quickly be switched to the low power mode upon receipt of a YES inquiry to block 106. Whether or not the low power radio is depowered or put in a deep sleep state as a result of the trigger event, high power radio 64 is enabled or awoken to enable communications between the radio 64 and the radio 74 of base station hub 24. Media is then transmitted from radio 64 to 74 in blocks 102 and 104 as before, and the process continues.

Accordingly, the invention provides a new and useful power saving technique utilizing two different radios, where the communication can be transmitted by one or the other depending on whether a low power mode or high power mode is selected either manually or automatically.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A method of operating a battery-powered electronic device, the method comprising:
   transmitting data wirelessly using a first radio of the electronic device, the first radio having a first power requirement;
   detecting a trigger event, the trigger event comprising detecting battery charge as being beneath a designated threshold; and
   in response to the detection of the trigger event,
   terminating transmission of data from the first radio and initiating transmission of data wirelessly using a second radio of the electronic device, the second radio having a second power requirement lower than the first power requirement;
   subsequently detecting a battery charge as being above a designated threshold and, upon that detection, automatically terminating transmission from the second radio and re-initiating transmitting media using the first radio.

2. The method of claim 1, wherein the trigger event further comprises a user command.

3. The method of claim 1, wherein the trigger event further comprises the occurrence of a designated scheduled event.

4. The method of claim 1, further comprising, in response to the detection of the trigger event, depowering the first radio or putting the first radio into a deep sleep.

5. The method of claim 1, wherein the first radio is a wireless local area network (WLAN) radio operating at a frequency of over 1 GHz, and wherein the second radio is sub-GHz radio operating at a frequency of less than 1 GHz.

6. The method of claim 5, wherein the electronic device is an imaging device of a monitoring system, wherein the first radio transmits video and audio data, and wherein the second radio transmit still images and/or animated graphics interchange format images.

7. An electronic device comprising:
   a battery;
   a high power radio having a first power requirement;
   a low power radio having a second power requirement that is lower than the first power requirement; and
   a controller configured to:
     cause the high power radio to transmit data in the absence of the occurrence of a trigger event and, upon the occurrence of a high trigger event, cause the high power radio to cease transmission of data and to cause the low power radio to initiate transmission of data, the trigger event comprising detecting battery charge as being beneath a designated threshold; and
     subsequently detect a battery charge as being above a designated threshold and, upon that detection, automatically terminate transmission of data from the low power radio and resuming transmission of data using the high power radio.

8. The electronic device of claim 7, wherein the electronic device is an image capturing device that has a capture element configured to capture visual image data.

9. The electronic device of claim 8, wherein the electronic device is a digital video camera, and wherein the capture element is configured to capture a video image.

10. The electronic device of claim 7, wherein the high power radio operates at a frequency of over 1 GHz, and wherein the low power radio is sub-GHz radio operating at a frequency of less than 1 GHz.

11. The electronic device of claim 7, wherein the high power radio is a wireless local area network (WLAN) radio operating within a frequency range of 2.4 GHz to 5.12 GHz.

12. The electronic device of claim 7, wherein, upon occurrence of the trigger event, the controller is configured to depower the high power radio or put the high power radio into a deep sleep state.

13. The electronic device of claim 7, wherein the trigger event further includes at least one of
   1) occurrence of a scheduled event, and
   2) receipt of a manual command from a user.

14. A monitoring system comprising:
   a base station hub that is operatively connected to a wireless wide area network (WAN) and that has a first radio;
   a security hub having a second radio;
   at least one digital video camera comprising
     an image capture element,
     a battery,
     a high power radio that is in operative communication with the first radio of the base station hub and that has a first power requirement,
     a low power radio that is in operative communication with the second radio of the security hub and that has a second power requirement, the second power requirement being lower than the first power requirement; and
     a controller that is configured to:
       cause the high power radio of the camera to transmit data to the first radio of the base station hub in the absence of the occurrence of a trigger event, upon the occurrence of a trigger event, to cause the high power radio to cease transmission of data and to cause the low power radio of the camera to initiate transmission of data to the second radio of the security hub, the trigger event comprising detecting battery charge beneath a designated threshold; and
       subsequently detect a battery charge above a designated threshold and, upon that detection, automatically terminate transmission from the low power radio and to reinitiate the transmission of media using the high power radio.

15. The system of claim 14, wherein the high power radio is a wireless local area network (WLAN) radio operating within a frequency of 2.4 GHz to 5.12 GHZ, and wherein the low power radio is a sub GHz radio operating at frequency of less than 1 GHz.

16. The system of claim 14, wherein the base station hub is connected to the Internet, and the security hub is connected to a cellular network.

17. The system of claim 14, wherein, upon occurrence of the trigger event, the controller is configured to depower the high power radio or put the high power radio in a deep sleep state.

18. The system of claim 14, wherein the trigger event further comprises at least one of:
   1) occurrence of a scheduled event, and
   2) receipt of a manual command from a user.

* * * * *